PHILIPPE DE CLAMECY.
METHOD OF HUMIDIFYING AIR.
APPLICATION FILED SEPT. 3, 1919.
1,422,839.
Patented July 18, 1922.
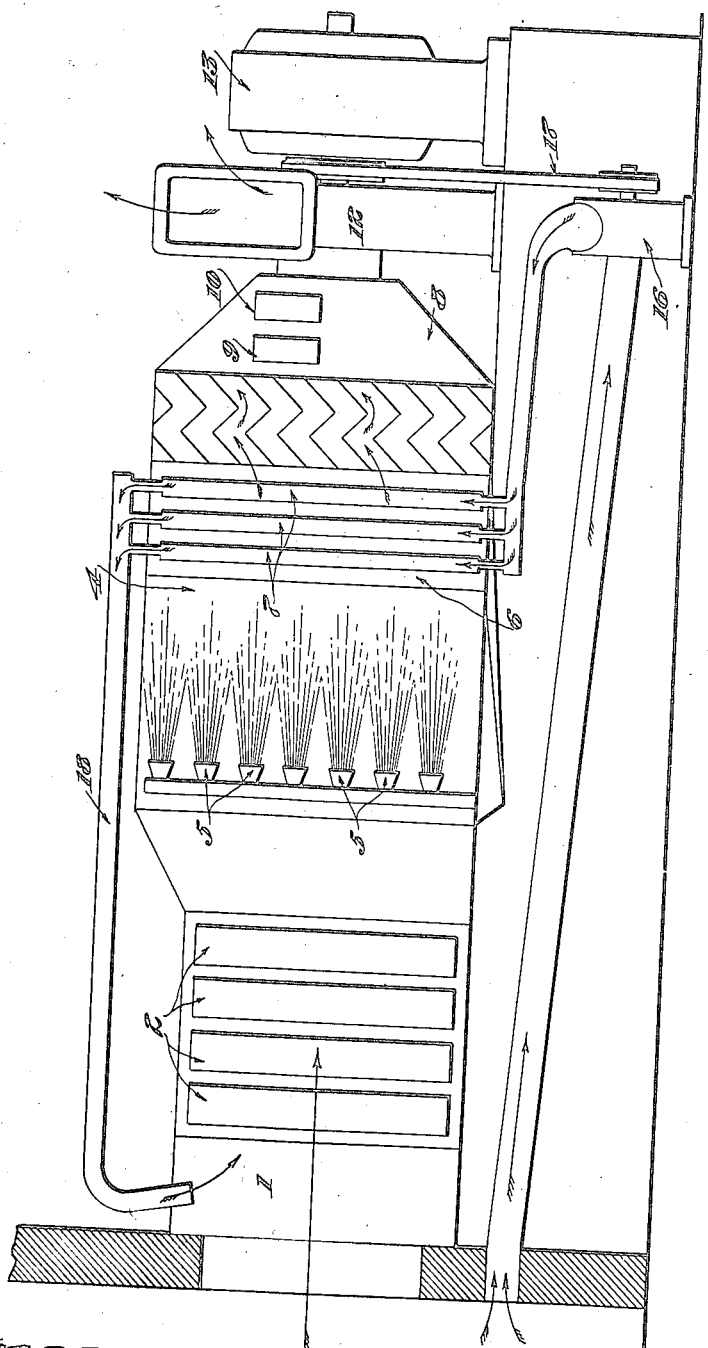

UNITED STATES PATENT OFFICE.

PHILIPPE DE CLAMECY, OF BOSTON, MASSACHUSETTS, ASSIGNOR TO B. F. STURTE-VANT COMPANY, OF BOSTON, MASSACHUSETTS, A CORPORATION OF MASSA-CHUSETTS.

METHOD OF HUMIDIFYING AIR.

1,422,839.      Specification of Letters Patent.      Patented July 18, 1922.

Application filed September 3, 1919. Serial No. 321,392.

*To all whom it may concern:*

Be it known that I, PHILIPPE DE CLAMECY, a citizen of the United States, residing at Boston, in the county of Suffolk and State of Massachusetts, have invented certain new and useful Improvements in Methods of Humidifying Air; and I do hereby declare the following to be a full, clear, and exact description of the invention, such as will enable others skilled in the art to which it appertains to make and use the same.

The present invention relates to a method of humidifying air, and more particularly to a method of tempering and humidifying air for use in school houses, factories and buildings of this character.

It has long been recognized that some method of artificially controlling the humidity of atmospheric air, especially in cold weather, was desirable. This is apparent when it is remembered that the moisture content of cold atmospheric air when heated to a room temperature of approximately 70 degrees is extremely small. Perhaps the best known method of regulating the temperature and humidity of atmospheric air consists in first saturating atmospheric air which has been heated to a predetermined temperature somewhat lower than the final temperature at which it is desired to use the air, and then reheating the saturated air a predetermined amount to bring the air to the desired condition of temperature and relative humidity.

This method, as well as others which have been suggested for controlling the temperature and humidity of atmospheric air, have certain disadvantages, however, which it is the object of the present invention to overcome.

It has been found that air at any given temperature absorbs atomized water at a predetermined rate which can be measured as a definite time interval required to absorb sufficient atomized water to saturate the air with water vapor. Thus it can readily be seen that by maintaining the air in contact with atomized water for a time interval somewhat less than that required to absorb sufficient atomized water to saturate the air, a partial saturation of the air may be obtained, and by suitably varying this time interval any desired relative humidity of the air can be secured.

Accordingly, one feature of the present invention consists in retaining atmospheric air to be treated in contact with a superabundance of atomized water for a predetermined interval of time sufficient to permit a definite percentage of the atomized water to be absorbed as water vapor by the air, and then removing from the humidified air the surplus atomized water which has not been evaporated in the form of water vapor.

In order to understand this principle of operation the distinction between atomized water, so-called, and water vapor should be clearly understood. The atomized water consists in the finely divided particles of liquid which are sprayed into the air to be treated. This water is not evaporated by the air instantly, but a definite time interval is required for this purpose varying with the temperature of the air. For example, it is found that air at 55° F. requires a total elapsed time of about $4\frac{1}{2}$ seconds to evaporate all of the atomized water necessary to completely saturate it, and air at 150° F. requires about $1\frac{1}{4}$ seconds to accomplish the same result.

According to the present invention the atmospheric air to be treated is first heated to a temperature higher than that finally desired, and is then passed through a series of sprays or other devices which cause the air to take up more than sufficient atomized water to completely saturate it. After a definite time interval which may be controlled by the velocity with which the air passes through the apparatus the heated air containing particles of atomized water in suspension is brought in contact with devices for precipitating substantially all of the atomized water not then evaporated from the air. The time interval during which the heated atmospheric air is maintained in contact with this atomized water may, and preferably is, less than that required to evaporate sufficient water to completely saturate the air, so that when the atomized water is precipitated the air is only partially saturated, its degree of saturation depending upon factors which may be readily controlled.

The accompanying drawing illustrates diagrammatically one form of apparatus which may be employed for carrying out the improved method of humidifying atmospheric air. In this apparatus the cool atmospheric air is initially admitted to a chamber 1, provided with heating coils 2, which are designed to raise the temperature of the air to a point higher than that finally desired. The air is conducted from the heating chamber into a spray chamber 4, provided with a plurality of spray nozzles indicated at 5, which discharge a relatively large quantity of atomized water into the air. The amount of water discharged is normally greater than that necessary to saturate the air at a given temperature. From the spray chamber the heated and wet air is conducted to a precipitating or condensing chamber 6, which is preferably provided with a screen of cool plates 7, adapted to separate the atomized water still remaining unevaporated from the air. It is found that air carrying this atomized water in suspension immediately precipitates the latter upon contact with a cooling medium without substantially lowering the temperature of the air. The heated and wet air is retained in contact with these plates for only a sufficient length of time to precipitate these particles of liquid water, but without condensing any of the water which has been previously evaporated. It should be understood that the time interval during which the heated air is maintained in intimate contact with the water before the unevaporated water is precipitated by the plates governs the final relative humidity of the air. In case all of the atomized water is not removed from the air or if the lowered temperature of the wet air has condensed some of the water previously evaporated, an eliminator is provided for removing any remaining water which is still carried in suspension. After passing out of the eliminator the air, which is then in condition for use, may pass into a chamber 8 in which is located a thermostat 9 and a hydrostat 10, which respectively control the initial heating of the air and the rate of flow of the air to the heating chamber 1. The temperature of the air when it reaches the chamber 8 is substantially lower than the initial temperature of the air after passing through the chamber 1. The temperature at which the air is initially heated is properly regulated to cause the air to enter the chamber 8 at a proper degree for use in the building.

The air is drawn through the apparatus in the direction of the arrows by any usual type of fan indicated at 12, which may be operated through suitable driving connections from a motor 13. It is desirable to cool the precipitating plates with the cool atmospheric air, and to this end the plates, as shown in the drawing, are made in the form of hollow tubes connecting with an atmospheric air duct 15 through which air is drawn by a fan or blower indicated at 16. This air is delivered to the bottom of the hollow tubes passing upwardly therethrough and thence through an exhaust duct 18 into the chamber 1. The blower 16 may conveniently be operated from the motor 13 through a driving belt indicated at 17.

Having thus described the invention, what is claimed is:

The method of humidifying air which consists in heating the air to a temperature in excess of the temperature at which it is to be delivered, spraying water into the heated air, projecting the heated air against a separating surface to precipitate a portion of the water held in suspension by the air, maintaining the separating surface cool by means of a current of air which first cools the separating surface and then becomes a part of the supply of air to be heated, and allowing the remaining portion of the water held in suspension by the air and not precipitated on the separating surface to be vaporized to give the desired humidity at the desired temperature.

PHILIPPE DE CLAMECY.